United States Patent [19]
Griffin

[11] 3,918,800
[45] Nov. 11, 1975

[54] IMPACTING JET AERODYNAMIC WINDOW

[75] Inventor: William Stanley Griffin, Manhattan Beach, Calif.

[73] Assignee: Northrop Corporation, Los Angeles, Calif.

[22] Filed: Feb. 28, 1974

[21] Appl. No.: 446,811

[52] U.S. Cl. ......... 350/319; 331/94.5 G; 331/94.5 C
[51] Int. Cl.² .......................................... H01S 3/22
[58] Field of Search ..................... 350/319; 330/4.3; 331/94.5

[56] References Cited
UNITED STATES PATENTS
3,768,035   10/1973   Zar .............................. 331/94.5 X

*Primary Examiner*—Robert J. Webster
*Attorney, Agent, or Firm*—Edward A. Sokolski

[57] ABSTRACT

An impacting jet aerodynamic window structure for use in systems where passage of a distortion free light beam is desired. Specifically this window structure is highly effective for use in subsonic flow gas laser systems. The window is optically clear even in the presence of large density or temperature differences between a laser gas and another gas used in the window structure. This form of laser system would include a laser cavity in conjunction with the aerodynamic window structure so that gases can be removed from the laser cavity and which window structure permits the passage of a laser beam through the window structure. The window structure comprises a pair of opposed nozzles which have their outlets spaced apart and axially aligned. One of the nozzles permits the flow of a laser gas from a laser cavity. The second nozzle permits the flow of a gas, of different composition and/or temperature. The two gases are introduced into an interaction region formed between the outlets of the respective nozzles and impact in this interaction region to form a laminar impact plane. A plenum chamber may surround the interaction region and is provided with a pump to remove the gases which are introduced into the region and impact at the laminar impact plane. A method of forming the impacting jet aerodynamic window structure is also disclosed.

10 Claims, 4 Drawing Figures

IMPACTING JET AERODYNAMIC WINDOW

BACKGROUND OF THE INVENTION

The invention herein described was made in the course of, or under, ARPA-ONR Contract No. N00014-72-C-0043 with the U.S. Department of the Navy, Office of Naval Research.

This invention relates in general to certain new and useful improvements in aerodynamic window structures, and more particularly, to impacting jet aerodynamic window structures for use in systems where optically clear, distortion free light beam passage is desired, as in various laser systems.

Presently, two types of windows are used in laser devices. These windows permit distortion free passage of a laser beam from a laser cavity to the external ambient and provides an interface between the laser gas and the outside ambient. The first of these windows is the transmissive window, namely a window constructed in the form of a wall of a solid material which will permit transmission of laser light but which will prohibit passage of the laser gas or any gas external to the laser system. The second type of window is the so-called "aerodynamic" window which utilizes moving streams of gas rather than a solid material. Considerable attention has been devoted to the design of aerodynamic windows for laser systems in recent years. These efforts resulted from the desire to utilize window structures in gas laser systems which will provide good optical quality, but which would not be damaged or distorted by the laser beam.

In gas laser systems which generate light beams of low average power, transmissive windows formed of a material designed to transmit the laser wave length have been used with effectiveness. However, these transmissive windows have been found to be of limited use in lasers of higher power. In high power lasers, appreciable heating may occur in the output windows. This heat must be continuously removed if the window is to retain its structural and optical integrity. Consequently, high power laser devices must either be constructed with expensive cooling systems specifically designed to protect the transmissive window against heat degradation, or otherwise aerodynamic windows must be used. Frequently, satisfactory cooling of a transmissive window is impractical or impossible.

If the lasing gas which is used in the gas laser system is cryogenic, such as is the case for cabron monoxide, the transmissive window must be isolated from the external enviroment to prevent frost buildup and secondary thermal conduction currents which would also degrade the optical quality of the laser beam. Furthermore, during the startup of a cryogenic gas laser, the transmissive windows, which are initially warm, must be slowly cooled to the lasing gas temperature in order to prevent cracking or the loss of sealing integrity. This cool-down period represents an operational limitation on the laser device.

Consequently, much attention has been devoted to aerodynamic windows which are free of the limitations inherent to transmissive windows. Generally, these aerodynamic windows have been constructed in the form of the so-called "supersonic flow windows" or the "vortex" type of flow window. The supersonic flow window suffers from high mass flow consumption and the vortex type of flow window generally exhibits poor optical quality. For example, aerodynamic windows of the types mentioned above are taught in U.S. Pat. No. 3,617,928, U.S. Pat. No. 3,604,789, and U.S. Pat. No. 3,645,569. Again, each of the aerodynamic window structures taught in these references suffer from the limitations described above.

A third type of aerodynamic window can be conceived which is similar to the supersonic flow window, but which utilizes a subsonic stream instead of a supersonic stream. However, in this third type of aerodynamic window, the laser gas and the window gas are introduced as parallel streams. This type of window has shown poor optical quality if the index of refraction of the window flow gas is different from either the laser cavity gas or from that of the outside atmosphere.

It is therefore the primary object of the present invention to provide an impacting jet aerodynamic window structure for use with subsonic flow gas laser systems and which maintains both high optical quality and low fluid consumption.

It is another object of the present invention to produce an impacting jet aerodynamic window structure of the type stated which permits transmission of a laser beam with the maintenance of optical quality of the laser beam close to diffraction limited performance.

It is a further object of the present invention to provide a gas laser device which includes one or more of the aerodynamic window cavity structures in combination with a laser cavity.

It is an additional object of the present invention to provide an impacting jet aerodynamic window structure for use in systems where optically clear distortion free light beam passage from one fluid to another is a desirable or necessary condition.

It is another salient object of the present invention to provide an impacting jet aerodynamic window structure for use in systems where two or more gases flow together and where optically clear and distortion free optical qualitites at the interface thereof is a desirable or necessary condition.

It is also an object of the present invention to provide a method of forming an impacting jet aerodynamic window structure for use in gas laser systems and which method permits the passage of a laser beam with the high optical quality of a supersonic flow window and the low flow consumption of a vortex type window.

With the above and other objects in view, my invention resides in the novel features of form, construction, arrangement, and combination of parts presently described and pointed out in the claims.

GENERAL DESCRIPTION

The present invention can be described in general terms as an impacting jet aerodynamic window structure for use where at least two gases flow together to form an impact plane. This aerodynamic window structure will comprise a first nozzle means which permits the passage of a first gas. This first nozzle means is provided with an outlet end. A second nozzle means is spaced from the first nozzle means to permit a passage of a second gas therethrough. The second nozzle means is also provided with an outlet end spaced from and opposed to the outlet end of the first nozzle means thereby forming an interaction zone therebetween. The gases are introduced into the first and second nozzle means to form jet streams of gases passing through the nozzle means and which impact in the interaction zone to form a laminar impact plane.

The impacting jet aerodynamic window structure of the present invention can be characterized in further detail in that means is provided to remove the gases introduced into the cavity. In a preferred aspect of the invention, the first and second nozzle means comprise first and second nozzles respectively, which have aligned centerlines and permit the passage of a light beam therebetween. The first gas may be at a substantially colder temperature (that of the laser cavity) than the second gas at the impact plane, or for that matter, the first gas may be warmer than the second gas. Furthermore, a static pressure difference may exist between the two nozzles.

The present invention may also be used as an integral part of a complete gas laser device. This laser device of the present invention will use the aerodynamic window structure described above. The laser device comprises in combination a means to form a laser cavity which receives the first gas, which in this case will be a laser gas of the type hereinafter described. Means is operatively associated with this cavity to generate a laser with the first gas. Generally, this last mentioned means may comprise an anode and a cathode which are established on opposite sides of the cavity.

The first nozzle means is located at one end of this laser cavity and opens into an aerodynamic window area. This first nozzle means receives the first gas and introduces a jet stream of this laser gas into the window area. A second nozzle means is spaced from the first nozzle means and forms an interaction zone therebetween in the window area. The second nozzle means also permits the passage of a second gas and introduces a jet stream of the second gas into the window area to be impacted with the first gas at a laminar impact plane in the interaction zone of the window area. The gas laser device can be characterized in further detail in that the first and second nozzle means have spaced apart opposed outlet ends which establish the interaction zone in the aerodynamic window area.

In a preferred embodiment of the gas dynamic laser device, a third nozzle means is located at the opposite end of the laser cavity and opens into a second aerodynamic window area. The third nozzle means receives the laser gas and introduces a jet stream of the laser gas into the second window cavity. A fourth nozzle means is spaced from the third nozzle means and forms a second interaction zone therebetween in the second window area. The forth nozzle means permits passage of the second gas into the second window area to be impacted with the laser gas at a laminar impact plane in the second window area.

Also, in a preferred embodiment of the gas laser device, means is provided to remove the gases introduced into the first and second window areas mentioned above. The first and second nozzle means will also comprise first and second nozzles respectively, which have aligned centerlines and permit the passage of a light beam therebetween. The nozzles may have cylindrically shaped cross-sections and are axially aligned. However, the nozzles may also have other cross-sectioned shapes, e.g., square rectangular or the like.

The first gas may be again maintained at a colder or a warmer temperature than the second gas at the impact plane. In addition, the densities of the two gases may be different and moreover, the composition of the two gases may be different as will be more fully discussed hereinafter.

The present invention can also be described in general terms as a method of forming an impacting jet aerodynamic window structure for use in systems where at least two gases flow together to form an impact plane. This method comprises the permitting of the passage of a first gas through a first nozzle means having an outlet end. A second gas is passed through a second nozzle means spaced from the first nozzle means. This second nozzle means also has an outlet end spaced from and opposed to the outlet end of the first nozzle means, thereby forming an interaction zone between the outlet ends of said first nozzle means and the second nozzle means. The first and second gases are introduced into the first and second nozzle means at a velocity sufficient to form jet streams of the gases passing through the nozzle means. The gases are permitted to impact in the interaction zone with a pressure differential thereacross to form a laminar impact plane.

The method of forming an impacting jet aerodynamic window structure can be further characterized in that the gases which are introduced into the interaction zone are exhausted therefrom. The first and second nozzle means are located so that they have aligned central axes and permit the passage of a light beam therebetween. The first gas may again be maintained at a substantially colder or warmer temperature than the second gas at the impact plane. Furthermore, the densities and/or compositions of the two gases may be different. In addition, a differential pressure is established on opposite sides of the impact plane.

In a preferred aspect of the method of this invention, the system described above is a laser system. In this case, the first gas would be a laser gas used in the laser system in the generation of a light beam. However, it should be understood that the aerodynamic window structure of the present invention and the method therefore could be used in a wide variety of applications, not necessarily related to laser systems. For example, the window structure of the present invention could be used in absorption cells in which spectrographic analysis on gases is to be obtained. The aerodynamic window structure of the present invention is uniquely designed so that it will afford a clear and distortion free optical path when two gases impact at an impact plane.

FIGURES

Having thus described the invention in general terms, reference will now be made to the accompanying drawings in which:

DETAILED DESCRIPTION

Figure 1:
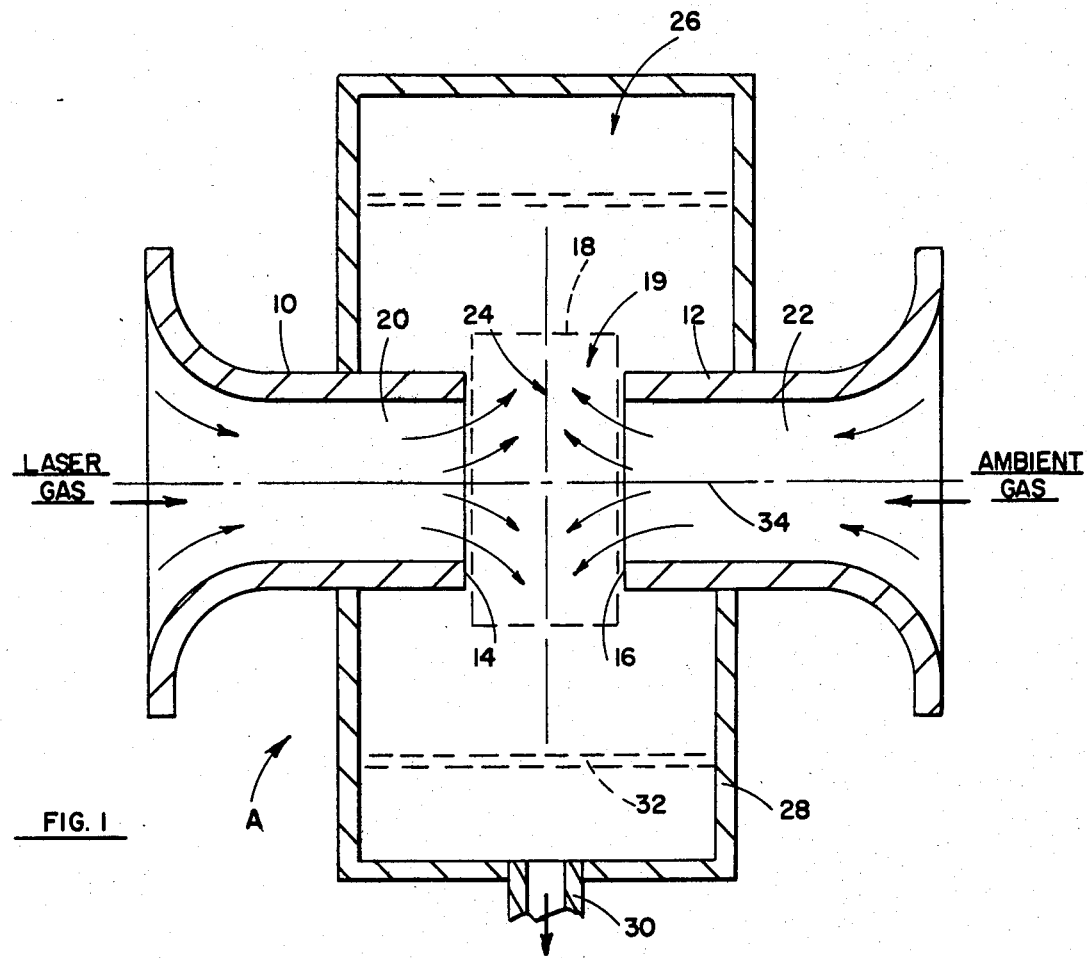
FIG. 1 is a schematic vertical sectional view showing an impacting jet aerodynamic window structure which is constructed in accordance with and embodies the present invention.

Referring now in more detail and by reference characters to the drawings which illustrate practical embodiments of the present invention, A designates an impacting jet aerodynamic window structure as illustrated in FIG. 1 of the drawings. This window structure A comprises a pair of jet nozzles 10 and 12 which are spaced apart from each other and are each provided with spaced apart opposed ends 14 and 16, respectively, which form a window area 18 therebetween.

The nozzles 10 and 12 each have straight sections 20 and 22 which permit the introduction of jet streams of gases into the window area 18. These jet streams of gas create an interaction zone, generally designated as 19 in the window area 18. Furthermore, the nozzles 10 and 12 may be circular in shape or essentially have any other cross-sectional shape as aforesaid. Preferably, the nozzles will have essentially the same cross-sectional size and will have their central axes aligned.

The supply gas for the nozzle 12 is generally an ambient temperature dry gas, such as for example, air from the external atmosphere, and is often referred to as a "secondary" flow gas. As indicated previously, the window structure of the present invention may be used with substantially any two gases. However, when the window structure is used with a layser system, the gas which is introduced into the nozzle 10 is a laser gas. The laser gas may be much colder than the warm flow gas, as for example, carbon monoxide which is normally used as a laser gas at cryogenic temperature. Furthermore, the two gases may have different densities and/or compositions.

For purposes of illustration, the aerodynamic window structure of the present invention will be described as being used in a laser system, although this description is only exemplary and non-limiting. The jet streams of gas or so-called "gas jets" which are introduced into the window area 18 will impact within the interaction region or "interaction zone", and thereby form an impact plane designated by reference numeral 24. It has been observed that an impact plane is created which is relatively laminar in the region between the two end walls 14 and 16 of the nozzles 10 and 12, respectively, and which is also relatively flat and stable. It has also been observed that the impact plane remains constant within the dimensions of the nozzles 10 and 12 and which essentially defines the interaction zone 19.

An exhaust chamber 26 formed by a chamber wall 28 is disposed around the cavity 18 and is provided with an exhaust port 30 which may be suitably connected to a pump or other type of exhaust equipment for scavenging the gases which are introduced into the window chamber 18. Further, a scavenging plate 32 preferably formed of a porous material can be located within the housing 28 for the purpose of uniformly scavenging the gases. The scavenging plate 32 can be constructed of a variety of materials which are gas porous, as for example, a screen mesh material or the like. Use of the scavenging plate is desirable but is frequently not necessary, and is hence a non-limiting aspect of the invention.

Preferably, the ends 14 and 16 of the two nozzles 10 and 12 are spaced apart from each other by a distance which is nominally less than one-half of the nozzle diameter. The laser beam will travel along the centerline of the two nozzles 10 and 12, that is, along the laser beam path designated by reference numeral 34. Because of its relatively low mass flow consumption, this type of aerodynamic window structure should enable a laser system to exhibit high specific power while maintaining the optical quality of its output beam relatively close to diffraction limits.

As used herein, the term "laser gas" refers to a particular gas which may be excited and thereby used in the generation of a laser beam, and these gases will normally contain the necessary constituents to generate a laser beam. Examples of these gases are carbon monoxide, carbon dioxide, hydrogen chloride, hydrogen flouride and the like. Many of these gases are typically mixed with diluents, and in the case of carbon monoxide, diluents such as nitrogen, argon, or helium may be used. Furthermore, many of the gases may be maintained at relatively low temperatures, as for example, 80° Kelvin to 100° Kelvin at 1 atmosphere of pressure for carbon monoxide. In some cases, the laser action in these gases normally occurs due to transitions between the energy states in the gas. For example, transition between the 001 and 100 energy state in carbon dioxide would produce a laser action. This energy for the upper state is obtained primarily by collision with the diluents such as the nitrogen molecules. The diluents also serve to cause a rapid draining of the lower energy levels without causing high relaxation rates for the upper levels.

In the aerodynamic window structures of the present invention, the required pressure gradient is provided in the flow field to reduce or suppress the Ralgleigh instability. This instability would normally otherwise occur in the interference of two parallel flowing gases or fluid streams of different densities.

In a particular test conduted with the aerodynamic window structure A, an aerodynamic window of 6.3 centimeters diameter was used, and smoke was introduced into the warm flow nozzle 12. A strong illuminating light was directed to impinge on the impact plane 24 to permit photographing of the interface between the two flows. It was observed that the flow was almost completely laminar and well behaved. Furthermore, the impact plane was found to be flat within two millimeters. Optical distortion of a light beam passing along the axis 34 was found to be negligible, even on an interferometric basis.

In another particular test conducted with the aerodynamic window structure A, a 1.27 centimeter diameter window was designed and constructed and tested with an airflow at room temperature and an airflow of nitrogen at 77°K. The aligned optical and gas flow axis, in this case, were vertically disposed with air introduced into the uppermost of the nozzles and cold nitrogen introduced into the lowermost of the nozzles. The lower most nozzle was connected to a long Lexan tube which had one end immersed in a bath of $LN_2$. A heater was also located in the bath and caused the $LN_2$ to boil and generate the cryogenic gaseous nitrogen which flowed upwardly into the lower nozzle and then into an impact plane. A one inch diameter mirror was mounted on the inside of the cryogenic gas flow tube and formed one leg of a Twyman-Green interferometer.

The optical quality of this aerodynamic window was studied interferometrically during the operation of the aforesaid test and the quality of the window was also studied statically. The light beam traversed a total path length of cryogenic gas of approximately 0.75 meter.

Measurements indicated that the window quality was substantially greater than one fringe of a helium-neon laser light.

Figure 4:
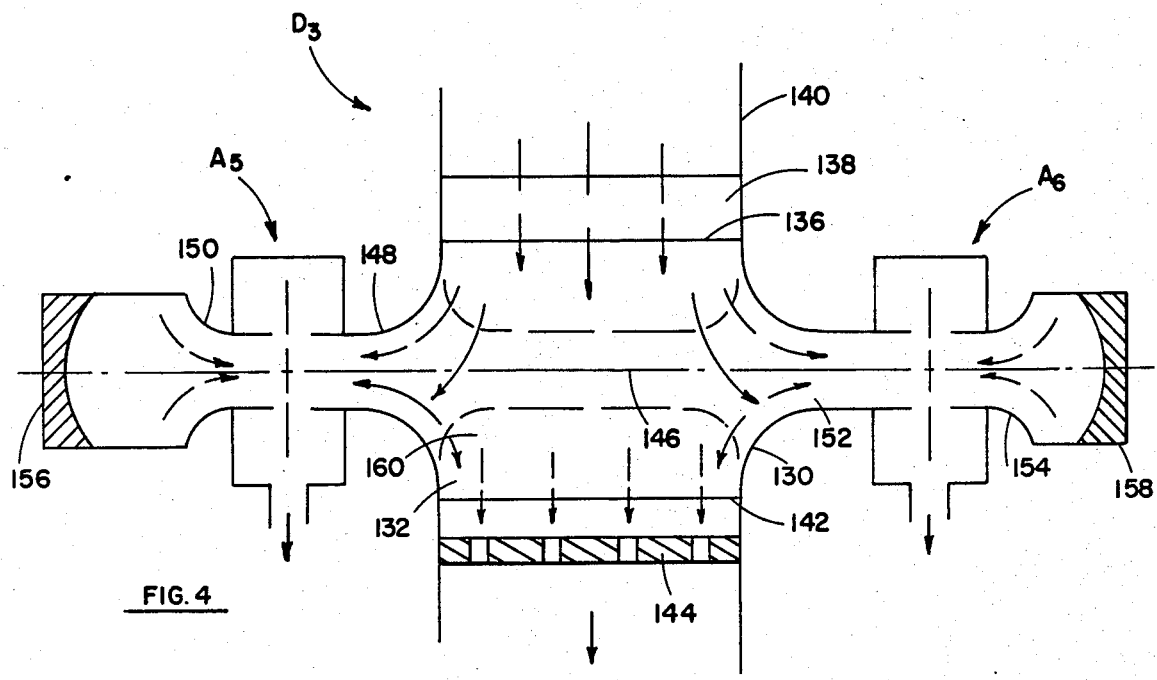
FIG. 4 is a schematic side elevational view, partially in section, and showing a further modified form of gas laser device constructed in accordance with and embodying the present invention.
Figure 2:
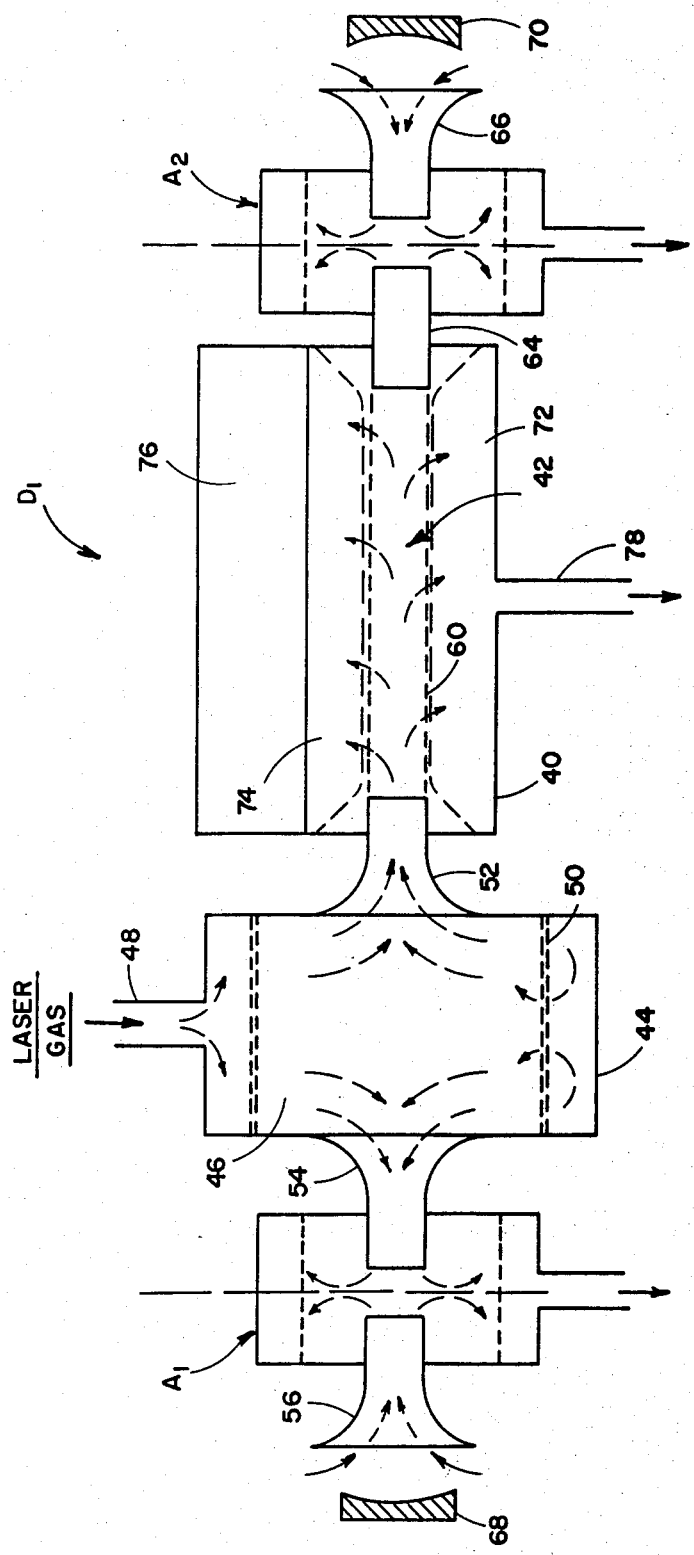
FIG. 2 is a schematic side elevational view, partially in section, of a gas laser device constructed in accordance with and embodying the present invention, and which utilizes a pair of the impacting jet aerodynamic window structures.
Figure 3:
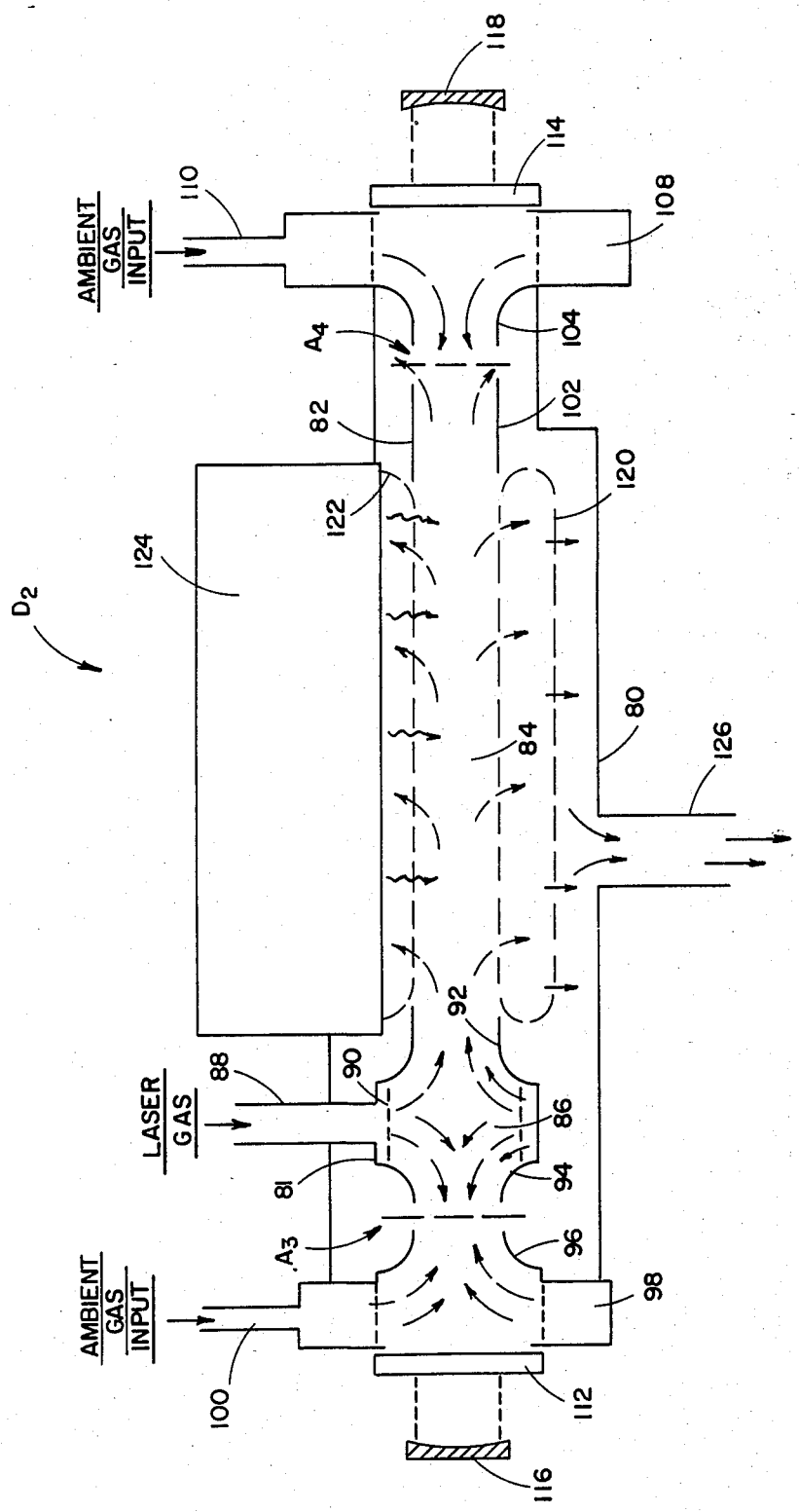
FIG. 3 is a schematic side elevational view, partially in section, and showing a modified type form of gas laser device constructed in accordance with and embodying the present invention.

FIGS. 2-4 represent several forms of gas laser devices which may be constructed in accordance with the present invention and which utilize the aerodynamic window structure A. In each of these laser devices, subsonic gas flows are generated. Thus, the velocity of the gas is less than its local speed of sound.

FIG. 2 illustrates one form of laser device $D_1$ which generally comprises an outer housing 40 and which forms an internal plenum chamber or laser chamber 42, often referred to as a "laser cavity". A chamber-forming housing 44 is located on the left-hand end of the housing 40, and which forms a laser gas supply chamber 46. The housing 44 may be provided with an inlet port 48 which is connected to a supply of the laser gas (not shown). In addition, the gas would pass through a smoothing plate 50 located internally within the housing 44.

One sidewall of the housing 44 is provided with an outlet nozzle 52 which extends into the laser chamber 42, in the manner as illustrated in FIG. 2, and thereby introduces the laser gas under pressure into the laser chamber 42. The housing 44 is also provided with another outlet nozzle 54 forming part of an aerodynamic window $A_1$ which corresponds substantially identically to the aerodynamic window A. In this case, the nozzle 54 which forms part of an aerodynamic window $A_1$ also corresponds to the nozzle 10 in the window A. The aerodynamic window $A_1$, in this case, is also provided with an axially aligned nozzle 56 which corresponds to the nozzle 12 in the aerodynamic window structure A.

A porous widewall 60 may also be disposed within the laser chamber 42 to form a laser gas flow path. In this case, the sidewall 60 is preferably, though not necesshrily concentrically disposed within the chamber 42. Located on the downstream side of the gas flow path is a discharge nozzle 64 which forms part of an aerodynamic window structure $A_2$, the latter corresponding substantially identically with the aerodynamic window structure A. The discharge nozzle 64 in this case corresponds to the flow nozzle 10 in the window structure A. Again, the aerodynamic window structure $A_2$ is provided with a nozzle 66 which corresponds to the nozzle 12 of the aerodynamic window structure A, and which is also axially aligned with the nozzle 64. On each side of the nozzles 56 and 66, in the manner as illustrated in FIG. 2, are reflective mirrors 68 and 70 respectively, which serve to define the optical cavity of the laser. The mirror 70 permits transmission of the light beam to the outside ambient, although the type of optical cavity shown is known as a "stable cavity with a hole coupled output". It is readily appreciated by tose skilled in the art of laser technology that other optical resonator and mirror combinations could be used without altering the original purpose and operation of the impacting jet aerodynamic window concept.

A laser chamber 42 may also be provided with a porous metal anode 72 and porous metal cathode 74 (typically screen-wire or perforated metal plate). When energized by a D.C. potential and ionized, the electrons from an electron zone 76, a flow of electron is created thereacross. This electron flow will create ion pairs from the gas molecules. Furthermore, the laser chamber 42 may also be provided with a shock reflector plate, thermal smoothing screen, an orifice plate and other components (not shown), which may be found in laser chambers of this type.

The housing 40 is also provided with a discharge exhaust port 78 which may be connected to a suitable exhaust pump (not shown) for scavenging the excess gas within the chamber 42. It can also be observed that the nozzles 56 and 66 may use ambient air as a warm gas jet and the various windows $A_1$ and $A_2$ are also scavenged and ducted to an exhaust, as illustrated in FIG. 2.

It can be observed that the device $D_1$ effectively provides a pair of jet impact aerodynamic windows which enable the passage of the laser beam without destroying or affecting the optical quality thereof. Flow consumption in the gas laser device $D_1$ is approximately 20% higher than would be the case if aerodynamic windows were not used. The entire system utilizing the device $D_1$ is operational as soon as the inlet laser gas supply is properly connditioned and the laser gas has transversed the laser cavity.

The laser device $D_1$ provides the important practical advantage of eliminating material transmissive windows. Consequently, the previously described cool-down problems associated with the transmissive optics is circumvented. Furthermore, the aerodynamic windows $A_1$ and $A_2$ are immune to the thermal heating effects which normally occur in material transmissive windows. It was also found that the combined optical properties of the medium and the aerodynamic window was highly effective for the 5.0 $\mu$ wavelength. In addition, an optical path length of 0.75 meters was found to be close to the anticipated 1 meter path length of an actual laser system.

FIG. 3 represents another form of gas laser device $D_2$ which may be constructed in accordance with the present invention and which utilizes the aerodynamic window structure A. The laser device $D_2$ within the housing 80 is a cylindrically shaped porous chamber forming plate 82 which forms an internal plenum chamber or laser chamber 84. This chamber forming plate 82 is gas impervious and is preferably, though not necessarily concentrically disposed within the housing 80, and may be formed of a screen or other porous material. A chamber-forming wall 81 which forms a laser gas supply chamber 86 is establhshed within the housing 80 on the left-hand end of the plate 82. The chamber 86 4ay be provided with an inlet port 88 which extends through the housing 80 and is connected to a supply of the laser gas (not shown). In addition, the gas would pass through a porous screen 90 or other gas porous member located internally within the chamber 86.

The chamber-forming wall 81 is provided with an outlet nozzle 92 which extends toward the screen 90 and communicates with the laser chamber 84, in the manner as illustrated in FIG. 3. Consequently, the laser gas is introduced under pressure into the laser chamber 84. The chamber-forming wall 81 is also provided with another outlet nozzle 94 forming part of an aerodynamic window $A_2$ which corresponds substantially. identically in the aerodynamic window A. In this case, the nozzle 94 which forms part of an aerodynamic window $A_3$ also corresponds to the nozzle 10 in. case, is also provided with a nozzle 96 which corresponds to the nozzle 12 in the aerodynamic window structure A, and which is axially aligned with the nozzle 94. The nozzle 96 is disposed in fluid communication with an ambient gas input chamber 98, the latter having an inlet port 100 connected to a source of ambient gas (not shown). As used herein the term "ambient" is used in a generic sense to refer to any gas which is not the laser gas and which ambient gas may be provided from the external atmosphere such as air, or dry nitrogen, or it may be any other gas provided from a source of such gas.

Located on the downstream side of the gas flow path, formed by the chamber forming plate 82, is a discharge nozzle 102, which forms part of an aerodynamic window structure $A_4$, the latter corresponding substantially identically with the aerodynamic window structure A. The discharge nozzle 102 in this case corresponds to the flow nozzle 10, in the window structure A. Again, the aerodynamic window structure $A_4$ is provided with a nozzle 104 which corresponds to the nozzle 12 of the aerodynamic window structure A, and which is axially aligned with the nozzle 102. The nozzle 104 is also disposed in fluid communication with an ambient gas input chamber 108, the latter having an input port 110 connected to a source of ambient gas (not shown). Located at each of the opposite ends of the housing 80 material transmissive windows 112 and 114 which are, respectively, in communication with the warm gas chambers 98 and 108. On each side of the transmissive windows 112 and 114, in the manner as illustrated in FIG. 3, are reflective mirrors 116 and 118 respectively, which permit transmission of a laser beam.

The laser chamber 84 may also be provided with a porous anode 120 and a porous cathode 122, and an electronic gun 124. The anode (and/or cathode) are energized to create a D.C. potential thereacross and the electron gun provides high energy electrons which ionize the gas in the aforesaid manner. Furthermore, the laser chamber 84 may also be provided with a shock reflector plate, thermal smoothing screen, an orifice plate, and other components (not shown) which may be found in laser chambers of this type.

The housing 80 is also provided with a discharge or exhaust port 126 which may be connected to a suitable exhaust pump (not shown) for scavenging the excess gas passing through the chamber-forming plate 82. It can also be observed that the nozzles 96 and 104 may be supplied with ambient air as an ambient gas jet although, other ambient gas input sources such as warm nitrogen may preferably be employed. The various windows $A_3$ and $A_4$ are also scavenged and ducted through the exhaust port 126, in the manner as illustrated in FIG. 3.

It can be observed that the device $D_2$ also effectively provides a pair of jet impact aerodynamic windows which enable the passage of the laser beam without destroying or affecting the optical quality thereof. Further, the use of the aerodynamic windows enable the employment of the transmissive windows 112 and 114. It has again been found that flow consumption in the gas dynamic laser device $D_2$ is substantially higher than if aerodynamic windows were not used. The entire system utilizing the device $D_2$ is also operational as soon as the inlet laser gas supply is properly conditioned and the laser gas has traversed the laser chamber.

The laser device $D_2$ provides the important practical advantage of enabling the use of material transmissive windows, and hence permits a large difference between the internal gas pressure of the laser cavity 94, and that of the outside ambient. The laster beam is directed through the transmissive windows 112 and 114. These windows 112 and 114 can always be at ambient temperature conditions so scaling problems are minimized. Through this construction, the previously described cool-down problems associated with the transmissive optics is circumvented. Furthermore, the aerodynamic windows $A_3$ and $A_4$ permit the use of the transmissive windows 112 and 114 wince the aerodynamic windows $A_3$ and $A_4$ shield the transmissive windows 112 and 114 from thermal shock effects which normally occur in material transmissive windows.

FIG. 4 represents a further form of gas laser device $D_3$ which may be constructed in accordance with the present invention, and which utilizes the aerodynamic window structure A. It has the important practical advantages of permitting passage of the gas transverse to the optical axis 146 of the laser and, hence, much higher pulse repetition rates (in the case of a pulsed laser) and generally higher output powers (for either pulsed or CW lasers). The laser device $D_3$ generally comprises an outer housing 130 which forms an internal plenum chamber or laser chamber 132. A porous wall 134, which may adopt the form of porous sintered screen or other porous material, and which is rectangular in shape may be optionally disposed within the housing 130.

The housing 130 is provided along its side wall with a laser gas inlet port 136, which may be provided with a flow straightner 138. The inlet port 136 is also provided with a supply tube 140 which is, in turn, connected to a suitable source of the laser gas (not shown). Opposed to the inlet port 136 is an outlet port 142 which may be provided with exhaust flow restrictors 144. The outlet port may also be connected to a vacuum pump or other means (not shown) to exhaust the gas within the chamber 132. It can be observed that the major portion of the laser gas flow in the laser device $D_3$ is essentially perpendicular to the optical axis, designated by reference numeral 146.

One sidewall of the housing 130 is provided with an outlet nozzle 148 which forms part of an aerodynamic window $A_5$ and which orresponds substantially identically to the aerodynamic window A. In this case, the nozzle 148 which forms part of an aerodynamic window $A_5$ also corresponds to the nozzle 10 in the window A. The aerodynamic window $A_5$, in this case, is also provided with a nozzle 150 axially aligned with the nozzle 148, and which corresponds to the nozzle 12 in the aerodynamic window structure A.

Located on the opposite side wall of the housing 130 is a discharge nozzle 152 which forms part of an aerodynamic window structure $A_6$, the latter corresponding substantially identically with the aerodynamic window structure A. The discharge nozzle 152, in this case, corresponds to the nozzle 12 of the aerodynamic window structure A. On each side of the nozzles 150 and 154, in the manner as illustrated in FIG. 4, are reflective mirrors 156 and 158 respectively, which define the optical cavity and permit transmission of a laser beam.

The laser chamber 132 may also be provided with a porous anode (not shown) and a porous cathode (not shown) which are energized by an electronic gun (not shown) to energize the gas. Furthermore, the laser chamber 132 may also be provided with a shock reflector plate, thermal smoothing screen, an orifice plate, and other components (not shown), which may be found in laser chambers of this type.

It can be observed that the nozzles 150 and 154 may use ambient air or other warm gases as a warm gas jet and the various windows $A_5$ and $A_6$ are also scavenged and ducted to an exhaust, as illustrated in FIG. 4. It can also be observed that the device $D_3$ effectively provides a pair of jet impact aerodynamic windows which enable the passage of the laser beam without destroying or affecting the optical quality thereof.

It has been found that flow consumption in the gas laser device $D_3$ is again substantially greater than if aerodynamic windows had not been used. In addition, the entire system utilizing the device $D_3$ is operational as soon as the inlet laser gas supply is properly conditioned and the laser gas has traversed the laser chamber. This time is normally measured in milliseconds.

The laser device $D_3$ provides the important practical advantage of eliminating cold gas contact with the material transmissive windows, and also it provides high flow rates transverse to the optical axis and, hence, generally higher pulse repetition rates and output powers. Consequently, the previously described cool-down problems associated with the transmissive optics is circumvented and increased output power can be obtained. Furthermore, the aerodynamic windows $A_5$ and $A_6$ are immune to the thermal heating effects which normally occur in material transmissive windows.

Thus, there have been illustrated and described novel impacting jet aerodynamic window structures and a method of forming these same types, as well as laser devices utilizing such window structures, and which fulfill all of the objects and advantages sought therefor. Many changes, modifications, variations and other uses and applications of the window structures and the method and the laser devices will become apparent to those skilled in the art after considering this specification and the accompanying drawings. Therefore, all such changes, modifications, variations and other uses and applications which do not depart from the spirit and scope of the invention are deemed to be covered by the invention which is limited only by the following claims.

Having thus described my invention, what I desire to claim and secure by letters patent is:

1. An impacting jet aerodynamic window for use in providing an unobstructed light path between the interior of a chamber containing a first gas and an area outside of said chamber containing a second gas,
   a first nozzle having its inlet connected in fluid communication with said chamber,
   means for introducing said first gas into the inlet of said first nozzle at a velocity sufficient to cause a jet of said first gas to be emitted at the outlet of said first nozzle,
   a second nozzle having its inlet connected in fluid communication with said area outside of said chamber,
   means for introducing said second gas into the inlet of said second nozzle at a velocity sufficient to cause a jet of said second gas to be emitted from the outlet of said second nozzle,
   the outlets of said nozzles being positioned in axial alignment with each other in opposing relationship for permitting the jets to impact against each other form a stable flat laminar impact plane.

2. The device of claim 1 and further including a housing which extends between the outlets of said nozzles and surrounds the impact plane.

3. The device of claim 2 and further comprising means for scavenging excess gas from said housing.

4. The device of claim 1 wherein the nozzle outlets have areas on the order of the transverse cross-sectional area of said chamber.

5. The device of claim 4 wherein the nozzle outlets have substantially identical cross sections.

6. An impacting jet aerodynamic window for use in a laser system in providing an unobstructed light path for the laser beam between the interior of the laser chamber containing the laser gas and an area outside the chamber containing an ambient gas comprising:
   a first nozzle having its inlet connected in fluid communication with the laser chamber,
   means for introducing the laser gas into the inlet of said first nozzle at a velocity sufficient to cause a jet of the laser gas to be emitted from the outlet thereof,
   a second nozzle having its inlet in fluid communication with the ambient gas,
   means for introducing the ambient gas into the inlet of said second nozzle at a velocity sufficient to cause a jet of the second gas to be emitted from the outlet of the second nozzle,
   the outlets of the nozzles being positioned opposite each other in axially aligned relationship for permitting the jets to impact against each other to form a stable flat laminar impact plane.

7. The deivce of claim 6 and additionally including a housing which extends between the outlets of said nozzles and surrounds the impact plane.

8. The device of claim 7 and further comprising means for scavenging excess gas introduced into said housing.

9. The device of claim 6 wherein the nozzle outlets have areas on the order of the transverse cross-sectional area of said chamber.

10. The device of claim 9 wherein the nozzle outlets have substantially the same cross section.

* * * * *